United States Patent
Sands et al.

(10) Patent No.: US 9,141,284 B2
(45) Date of Patent: Sep. 22, 2015

(54) VIRTUAL INPUT DEVICES CREATED BY TOUCH INPUT

(75) Inventors: Ian M. Sands, Seattle, WA (US); John A. Snavely, Seattle, WA (US); Edwin Russ Burtner, Everett, WA (US); V. Kevin Russ, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 603 days.

(21) Appl. No.: 12/474,205

(22) Filed: May 28, 2009

(65) Prior Publication Data

US 2010/0302155 A1 Dec. 2, 2010

(51) Int. Cl.
*G06F 3/033* (2013.01)
*G06F 3/0488* (2013.01)
*G06F 3/042* (2006.01)

(52) U.S. Cl.
CPC ............ *G06F 3/04886* (2013.01); *G06F 3/042* (2013.01); *G06F 3/04883* (2013.01); *G06F 2203/04808* (2013.01)

(58) Field of Classification Search
CPC ......... G06F 3/033; G06F 3/041; G06F 3/042; G06F 3/04886; G06F 3/04883; G06F 2203/04808; G06F 3/038; G06F 2203/0333
See application file for complete search history.

(56) References Cited

U.S. PATENT DOCUMENTS

| | | | |
|---|---|---|---|
| 5,825,352 A | 10/1998 | Bisset et al. | 345/173 |
| 7,242,387 B2 | 7/2007 | Fitzmaurice et al. | |
| 7,337,410 B2 * | 2/2008 | Lin | 715/773 |
| 7,339,580 B2 | 3/2008 | Westerman et al. | 345/173 |
| 2003/0080947 A1 | 5/2003 | Genest | |
| 2004/0141015 A1 | 7/2004 | Fitzmaurice et al. | |
| 2005/0024324 A1 | 2/2005 | Tomasi | |
| 2005/0225538 A1 * | 10/2005 | Verhaegh | 345/173 |
| 2006/0125803 A1 * | 6/2006 | Westerman et al. | 345/173 |
| 2006/0227099 A1 | 10/2006 | Han | |
| 2007/0152966 A1 | 7/2007 | Krah et al. | 345/163 |
| 2007/0236475 A1 | 10/2007 | Wherry | |
| 2007/0257891 A1 | 11/2007 | Esenther et al. | 345/173 |
| 2007/0262964 A1 | 11/2007 | Zotov et al. | 345/173 |
| 2008/0106523 A1 | 5/2008 | Conrad | 345/173 |
| 2008/0128182 A1 | 6/2008 | Westerman et al. | 178/18.06 |
| 2008/0165132 A1 | 7/2008 | Weiss et al. | 345/173 |

(Continued)

OTHER PUBLICATIONS

Moscovich, T.; "Multi-touch Interaction"; http://www.moscovich.net/tomer/papers/multi-touch-CHI-DC.pdf; Apr. 22-27, 2006; 4 pgs.

(Continued)

*Primary Examiner* — Towfiq Elahi
(74) *Attorney, Agent, or Firm* — Jessica Meyers; Danielle Johnston-Holmes; Micky Minhas (57) ABSTRACT

An input device is created on a touch screen in response to a user's placement of their hand. When a user places their hand on the touch screen, an input device sized for their hand is dynamically created. Alternatively, some other input device may be created. For example, when the user places two hands on the device a split keyboard input device may be dynamically created on the touch screen that is split between the user's hand locations. Once the input device is determined, the user may enter input through the created device on the input screen. The input devices may be configured for each individual user such that the display of the input device changes based on physical characteristics that are associated with the user.

19 Claims, 5 Drawing Sheets

(56) References Cited

U.S. PATENT DOCUMENTS

| | | | |
|---|---|---|---|
| 2008/0229194 A1 | 9/2008 | Boler | |
| 2008/0297483 A1* | 12/2008 | Kim et al. | 345/173 |
| 2009/0027330 A1* | 1/2009 | Aida | 345/156 |
| 2009/0289911 A1* | 11/2009 | Nagai | 345/173 |
| 2010/0302144 A1 | 12/2010 | Burtner | |

OTHER PUBLICATIONS

Wikipedia; "Microsoft Surface"; http://en.wikipedia.org/wiki/Microsoft_Surface; Apr. 17, 2008; 9 pgs.

Leitner, J.; "Multitouch @ Laval Virtual"; http://mi-lab.org/blog/2008/04/17/multitouch-laval-virtual/; Apr. 17, 2008; 6 pgs.

George, J., et al.; "Tabletop Computers as Assistive Technology, Jennifer George & Gilbert Cockton"; http://shareitproject.org/workshop/TableTopas%20George%20AT_100708.doc; 2 pgs.

Under Mouse Arrest; "Microsoft's Multi-Touch 'Surface' Table computer launched by Microsoft"; http://www.under-mouse-arrest.com/2007_05_01 archive.html; May 31, 2007; 24 pgs.

U.S. Appl. No. 12/474,225, filed May 28, 2009, entitled "Creating a Virtual Mouse Input Device".

Stack Overflow; "*Is there Real Value in Multi-Touch Interface for a Desktop?*"; http://stackoverflow.com/questions/413977/is-there-real-value-in-multi-touch-interface-for-a-desktop; 2 pgs.

Moscovich, et al.; "*Multi-Finger Cursor Techniques*"; http://www.moscovich.net/tomer/papers/multifcursors-gi2006.pdf; 7 pgs.

Office Action mailed Jan. 30, 2012, in U.S. Appl. No. 12/474,225.
Office Action mailed Jul. 31, 2012, in U.S. Appl. No. 12/474,225.
Office Action mailed Mar. 12, 2013, in U.S. Appl. No. 12/474,225.
Office Action mailed Feb. 13, 2014, in U.S. Appl. No. 12/474,225.
Office Action mailed Jul. 15, 2013, in U.S. Appl. No. 12/474,225.
Final Office Action mailed Oct. 21, 2014, in U.S. Appl. No. 12/474,225.
Notice of Allowance mailed Jul. 6, 2015, in U.S. Appl. No. 12/474,225.

* cited by examiner

VIRTUAL INPUT DEVICES CREATED BY TOUCH INPUT

BACKGROUND

Computer display devices have been configured to function both as an input device and as a video output device. For example, computer display devices can be configured with touch surface mechanisms that allow users to enter user input data through a display surface. Sensors can detect when one or more objects contact a particular location on the display surface. A computer system can then perform some action in response to detecting the contact. For example, in response to detecting contact between an object and a display surface at a location corresponding to user-interface control, a computer system can perform some action associated with the user-interface control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A virtual input device is created in response to a user's placement of their hand on a touch screen. Different types of virtual input devices may be created. For example, when a user places one of their hands on the touch input device, a virtual mouse ring input device sized for the user's hand may be dynamically created. Similarly, when a user places two hands on the touch input device, two virtual mouse rings may be displayed. Alternatively, some other virtual input device may be displayed. For example, when the user places two hands on the device a split keyboard input device may be dynamically created on the touch input device that is split between the user's hand locations. Once created, the virtual input device is configured to receive user input until the hand that is associated with the virtual input device is no longer detected. The virtual input devices are sized such that the display of the virtual input device changes based on physical characteristics that are associated with the user's hands.

DETAILED DESCRIPTION

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
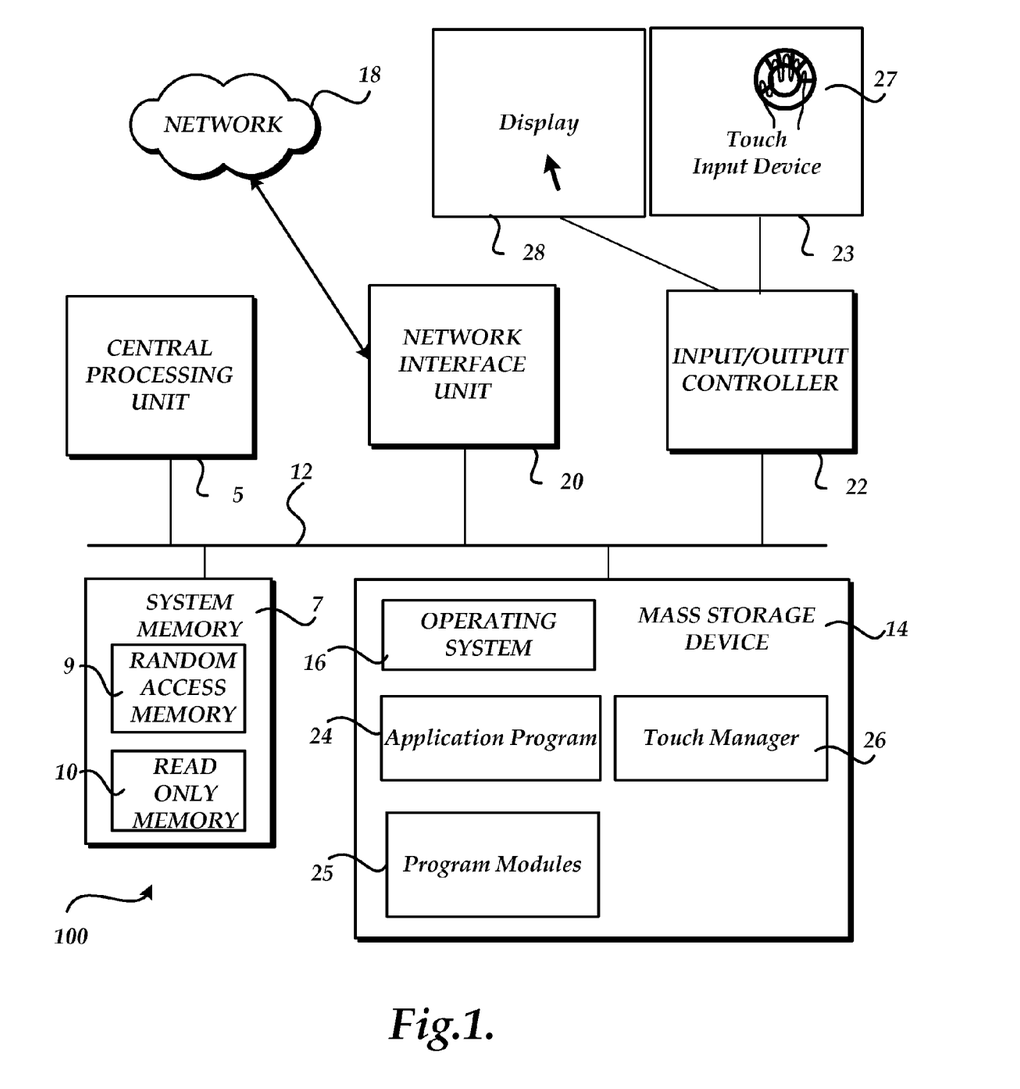
FIG. 1 illustrates an exemplary computing device.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program(s) 24, and other program modules 25, and touch manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Figure 2:
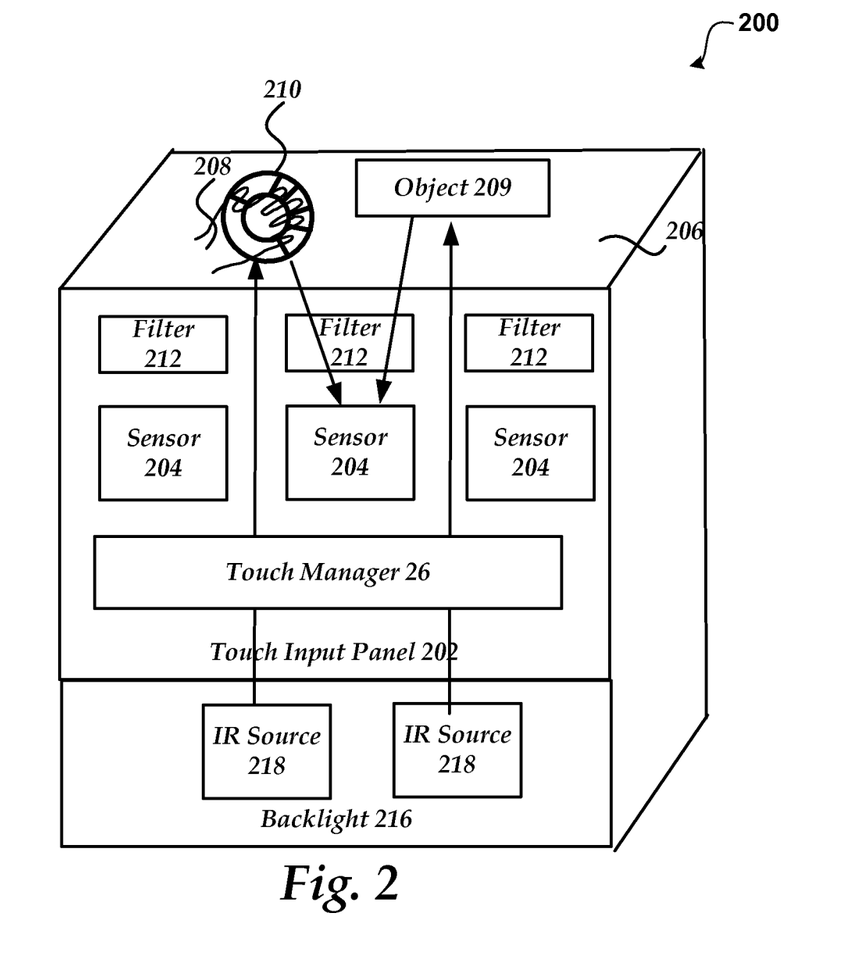
FIG. 2 illustrates an exemplary touch input system.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a touch input device 23. The touch input device may utilize any technology that allows more than one touch input to be recognized at a time. For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. An exemplary touch input device is shown in FIG. 2. The touch input device 23 may also act as a display.

The input/output controller 22 may also provide output to one or more display screens, such as display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS® VISTA® or WINDOWS® 7® operating system from MICROSOFT CORPORATION of Redmond, Wash. According to one embodiment, the operating system is configured to include support for touch input device 23. According to another embodiment, a touch manager 26 may be utilized to process some/all of the touch input that is received from touch input device 23.

The mass storage device 14 and RAM 9 may also store one or more program modules. In particular, the mass storage device 14 and the RAM 9 may store one or more application programs 24. In conjunction with the operation of the application, touch manager 26 provides a virtual input device that is created in response to a user's hand being detected by touch input device 23. Generally, touch manager 26 is configured to create a virtual input device in response to a user's placement of their hand(s) on the touch input device 23. Different types of virtual input devices may be created. For example, a virtual mouse ring 27 may be used as an input device when a user places their hand on the touch input device. The virtual mouse ring may include zero or more mouse buttons. The virtual buttons may be configured to activate functions associated with application 24 or some other function and/or program. As illustrated, virtual mouse ring 27 includes a mouse button that is located beneath each finger of the hand detected by touch input device 23. Similarly, when a user places two hands on the touch input device, two mouse rings may be displayed. Alternatively, some other type of virtual input device may be created. For example, when the user places two hands on the device a split keyboard input device may be dynamically created on the touch screen that is split between the user's hand locations. Once the virtual input device is created, the user may enter input through the created device on the input screen to interact with functionality that is provided by application 24. The virtual input device 27 is removed when the hand is no longer detected. The virtual input device 27 may also be associated with a location and interaction of a mouse cursor. For example, when the user moves their hand on touch input device 23, the virtual ring moves on a display of the touch input device 23 as well as moving the cursor on a display screen 28. The virtual input devices are created such that the display of the virtual input device changes based on physical characteristics that are associated with the user. According to one embodiment, the virtual input device is displayed within a ring that is positioned beneath a portion of the user's hand that is detected by touch input device 23. Additional details regarding the virtual input devices will be provided below.

FIG. 2 illustrates an exemplary touch input system. Touch input system 200 as illustrated comprises a touch panel 202 that has several sensors 204 integrated therein. According to one embodiment, the sensors 204 are Infrared (IR) sensors. Objects that in contact with or above a touchable surface 206 include a hand 208 that is in contact with touchable surface 206 and an object 209 that is close to but not in actual contact with ("adjacent") touchable surface 206. Object 209 may be another hand and/or some other physical object. Infrared sensors 204 are distributed throughout touch panel 202 and are disposed parallel to touchable surface 206. One or more of the infrared sensors 204 may detect infrared radiation reflected from the objects 208 and 209, as indicated by the arrows. Although the term "above" is used in this description, it should be understood that the orientation of the touch panel system is irrelevant. As shown in FIG. 2, touchable surface 206 is horizontal, but in a different embodiment generated by rotating system 200 clockwise by 90 degrees, touchable surface 206 could be vertical. In that embodiment, the objects from which reflected IR radiation is detected are to the side of touchable surface 206. The term "above" is intended to be applicable to all such orientations.

Touch panel 202 may comprise filters 212 that absorb visible light and transmit infrared radiation and are located between touchable surface 206 and IR sensors 204 in order to shield IR sensors 204 from visible light incident on touchable surface 206 in the case where IR sensors 204 are sensitive to a broader range of wavelengths of light other than purely infrared wavelengths.

Touch panel 202 may comprise a display that is configured to display images that are viewable via touchable surface 206. For example, the displayed image may be images relating to an application and/or a display of the virtual input device 210 that is created in response to a user's hand(s) being detected on touchable surface 206. The display may be, for example, an LCD, an organic light emitting diode (OLED) display, a flexible display such as electronic paper, or any other suitable display in which an IR sensor can be integrated.

System 200 may comprise a backlight 216 for the display. Backlight 216 may comprise at least one IR source 218 that is configured to illuminate objects in contact with or adjacent to touchable surface 206 with infrared radiation through touchable surface 206, as indicated by the arrows. IR sensors 204 are sensitive to radiation incident from above, so IR radiation traveling directly from backlight 216 to IR sensors 204 is not detected.

The output of sensors 204 may be processed by touch manager 26 and/or functionality included within an operating system or some other application to detect when a physical object (e.g., a hand, a bottle, a glass, a finger, a hat, etc.) has come into physical contact with a portion of the touch input surface 206 and/or a physical object is in close proximity to the surface. For example, sensors 204 can detect when a portion of hand 208 has come in contact with touch input display surface 206. Additional sensors can be embedded in the touch input display surface 206 and can include for example, pressure sensors, temperature sensors, image scanners, barcode scanners, etc., to detect multiple simultaneous inputs.

When the sensors 204 are IR sensors, the IR radiation reflected from the objects may be reflected from a user's hands, fingers, reflective ink patterns on the objects, metal designs on the objects or any other suitable reflector. Fingers reflect enough of the near IR to detect that a finger or hand is located at a particular location on or adjacent the touchable surface. A higher resolution of IR sensors may be used to scan objects in order to achieve higher resolution.

Sensors 204 can be included (e.g., embedded) in a plurality of locations. The density of sensors 204 can be sufficient such that contact across the entirety of touch input surface 206 can be detected. Sensors 204 are configured to sample the surface of touch input display surface 206 at specified intervals, such as, for example, 1 ms, 5 ms, etc. for detected contact and/or near contact. The sensor data received from sensors 204 changes between sampling intervals as detected objects move on the touch surface; detected objects are no longer within range of detection; and when new objects come in range of detection. For example, touch manager 26 can determine that contact was first detected at a first location and then contact was subsequently moved to other locations. In response, the virtual input device 210 and an associated cursor (if any) may be moved to correspond to the movement of the hand on the touch surface. Similarly, upon receiving an indication that contact is no longer detected anywhere on touch input surface the virtual input may be removed.

FIG. 2 provides just one example of a touch input system. In other exemplary touch systems, the backlight may not comprise any IR sources and the surface 206 may include a frontlight which comprises at least one IR source. In such an example, the touchable surface 206 of the system is a surface of the frontlight. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch input system 200 may comprise an OLED display which comprises IR OLED emitters and IR-sensitive organic photosensors (which may comprise reverse-biased OLEDs). In some touch systems, a display may not be included. Even if the touch system comprises one or more components or elements of a display, the touch system may be configured to not display images. For example, this may be the case when the touch input tablet is separate from a display. Other examples include a touchpad, a gesture pad, and similar non-display devices and components.

For some applications, it may be desirable to detect an object only if it is in actual contact with the touchable surface of the touch panel system. For example, according to one embodiment, the virtual input device 210 is only created when a user's hand is placed on the touchable surface 206. The IR source of the touch input system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Figure 3:
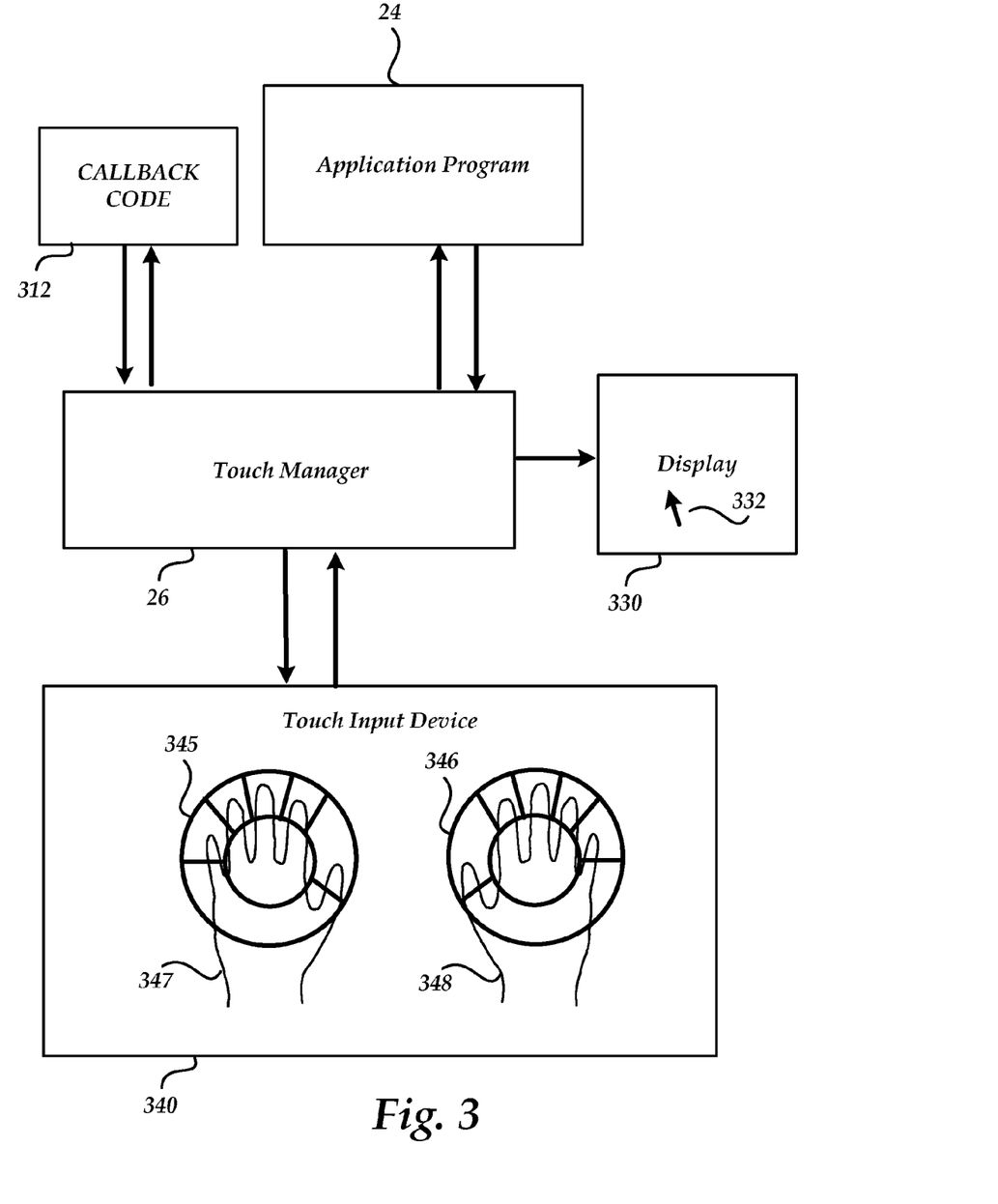
FIG. 3 shows a system for creating a virtual input device in response to a hand being detected by a touch input device.

FIG. 3 shows a system 300 for creating a virtual input device in response to a hand being detected by a touch input device. As illustrated, system 300 includes application program 24, callback code 312, touch manager 26, display 330, and touch input device 340.

In order to facilitate communication with the touch manager 26, one or more callback routines, illustrated in FIG. 3 as callback code 312 may be implemented. According to one embodiment, application program 24 is configured to receive input from a touch-sensitive input device 340. For example, touch manager 26 may provide an indication to application 24 when a user's hand (i.e. hand 347) selects a button on a virtual input mouse ring (i.e. virtual mouse ring 345).

According to one embodiment, a virtual input device is shown on the display of touch input device 340 when a user places their hand on the touch sensitive input device 340. The display of the virtual input device may be shown directly on the input device 340 and/or on a separate display. Additionally, when a user moves their hand that is placed on the touch input device, a cursor 332 may move in response to the movement of the hand on the touch screen. Similarly, when the user taps one of their fingers on a virtual mouse button, a function relating to application 24 and/or some other function may be invoked. In the current example, a user may select from one of ten virtual mouse buttons including one for each finger on the left hand 347 and one for each finger of the right hand 348. Either virtual input device 345, 346 may be used to move cursor 332. According to one embodiment, a circular graphic is displayed below and in response to a user's placed hand on the touch surface. When the virtual input device that is to be created is a virtual mouse ring, zero or more mouse buttons are disposed directly beneath a finger of the user. In this example, a virtual mouse button is created for each finger. When the virtual input device is referred to as a "virtual ring" then no buttons are displayed. Instead, the user is provided with a visual display of the rings to perform some interaction with the application program 24. For instance, a single ring could be shown to move cursor 332 in display 330. Two rings could be shown such that a user may perform a two-handed operation, such as stretching an object, shrinking an object, distorting an object, and the like. Additionally, the single ring could act as a single mouse button that is activated in response to a user tapping one or more of their fingers within the display of the virtual ring. A keyboard virtual input device may also be created that would display a split keyboard beneath a user's hand locations. The type of virtual input device created, the buttons (if any) displayed, the keys (if any) displayed, as well as the functionality that is associated with the buttons and keys that are displayed can vary depending on the context of the action, the application running, as well as items selected.

In the current example, a virtual input device is created in response to a user placing a majority of their hand on the touch surface. For example, a user places a portion of their palm and one or more fingers on the touch surface. According to one embodiment, when the virtual input device is a mouse ring, a button is created for each finger that is detected. As discussed above, an object may not need to be touching the touch input device in order to be detected. The size of the virtual ring is based on a detected size of the user's hand. The placement of the buttons is located such that each finger tip is positioned at or near the center of the virtual mouse button. In this way, the virtual input device is customized for each user. A larger hand will have a larger input ring, whereas a smaller hand will produce a smaller input ring. Touch manager 26 determines which hand(s) are placed on the device and what actions are occurring relating to the hand.

As opposed to a hardware input device, the virtual input device is only activated when a user places a portion of their hand on the touch surface. In this way, the mouse device is hidden when not needed by a user. Additionally, using a virtual input mouse allows a user to keep their hands on the touch surface without having to reach for a hardware mouse.

The inside of the virtual input device (in this case the center portion of the ring) can be used for touch operations that use the cursor as the focal point, such as: panning, zooming, rotating and scaling objects on the display.

Figure 4:
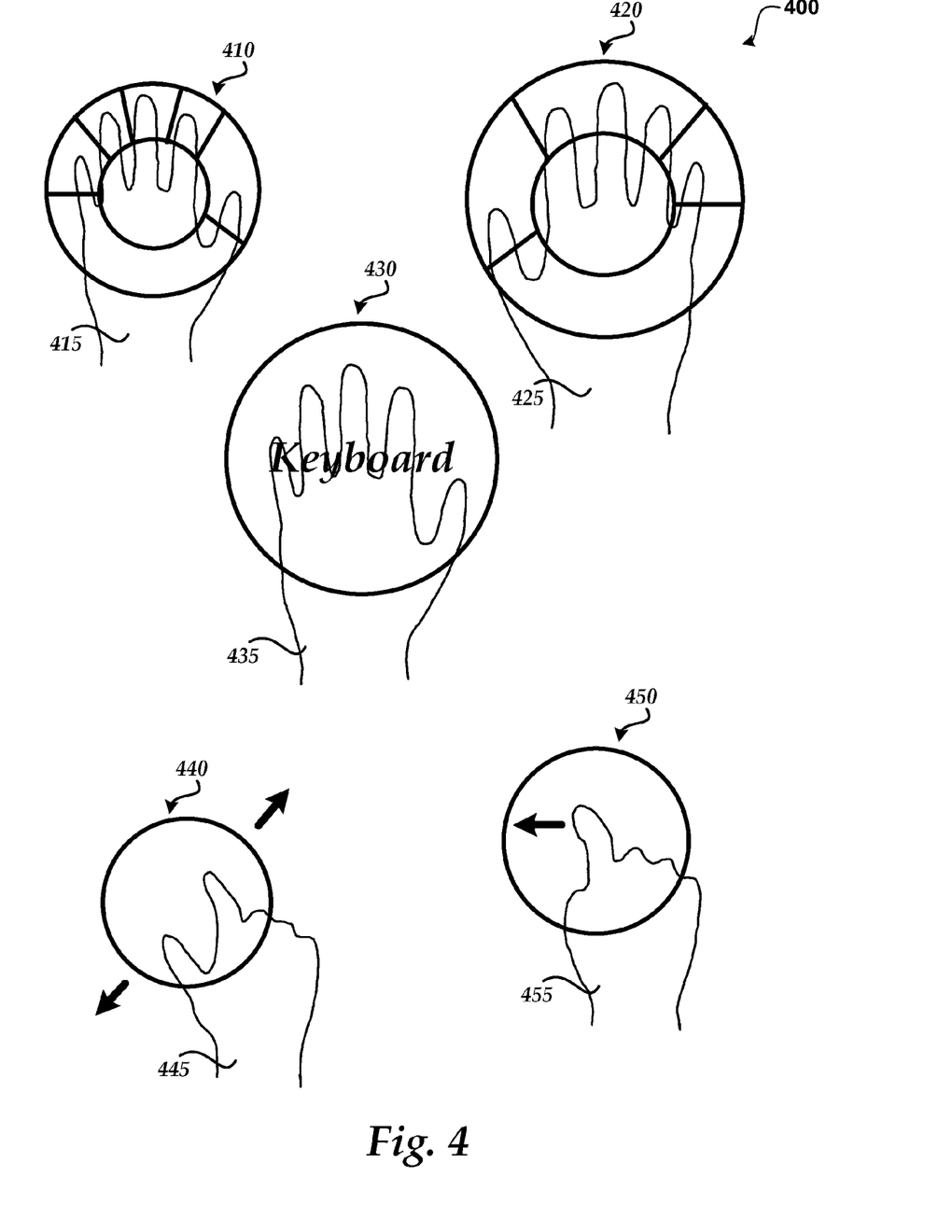
FIG. 4 shows exemplary virtual input devices 400.

FIG. 4 shows exemplary virtual input devices 400. According to one embodiment, a virtual input device is created in response to a user placing their hand on a touch input device. According to another embodiment, the virtual input device may be created in response to the user placing their hand close enough to a surface of the touch input device for it to be detected. The virtual input device is created based on the physical characteristics of the user's hand when it is detected by the touch system. According to one embodiment, the virtual input device is graphically illustrated as a ring that may contain different content such as keys and buttons. The virtual input device may also be graphically illustrated in other ways. For example, the virtual input device may be shown as a rectangle, a square, or some other shape. Generally, the virtual input is shaped and sized such that a user's fingers may be placed within the outer boundary of the shape that depicts the virtual input device.

Virtual input device 410 is a virtual mouse ring that is sized for left hand 415 and includes five mouse buttons that are disposed beneath each finger of left hand 415.

Virtual input device 420 is a virtual mouse ring that is sized for right hand 425 and includes three mouse buttons. As illustrated, one mouse button is disposed beneath a thumb, one mouse button is disposed beneath the middle three fingers, and a mouse button is disposed beneath the little finger. Many other combinations can be created for a virtual mouse ring. For example, a virtual mouse having zero or more buttons may be created. As can be seen, virtual mouse ring 420 is sized larger then virtual mouse ring 410 since hand 425 is larger than hand 415. While not shown, the size of the mouse buttons may also be adjusted based on a length of the fingers.

Virtual input device 430 is a virtual keyboard ring that is sized for left hand 435. According to one embodiment, the keyboard is a split QWERTY keyboard, where half of the keyboard is displayed beneath a single hand. Other keyboards having other keys may also be utilized. For example, a far east keyboard, may be created.

Virtual input device 440 is a virtual ring that is sized for right hand 445 and includes no mouse buttons. As illustrated, virtual ring 440 is receiving an input to stretch an object. In this example, a user is widening their thumb and index finger within the ring 440 to stretch an object.

Virtual input device 450 is a virtual ring that is sized for right hand 455 and includes no mouse buttons. As illustrated, virtual ring 450 is receiving an input to move a cursor. In this example, a user is moving their finger to the left causing the virtual ring to move to the left, which in turn moves the display of a cursor on a display screen.

Figure 5:
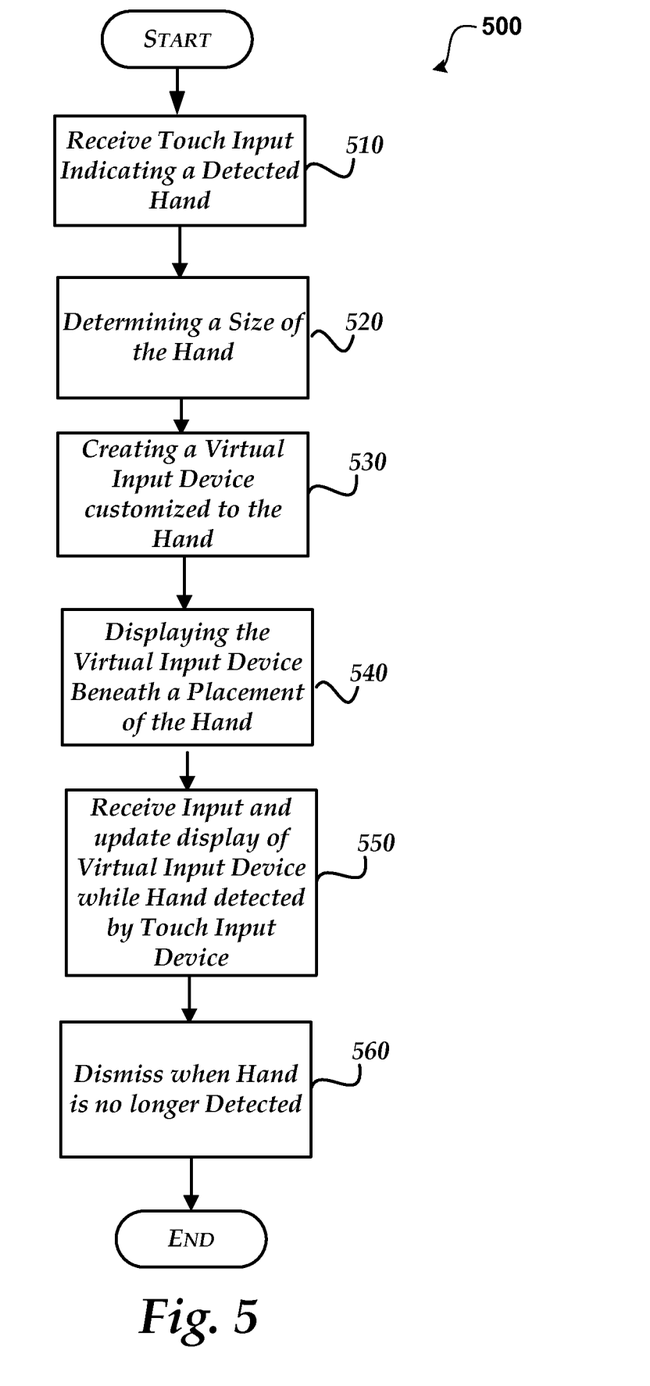
FIG. 5 shows an illustrative process for creating a virtual input device.

Referring now to FIG. 5, an illustrative process 500 for creating a virtual input device will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 510, where a touch input is received indicating that a least a portion of a user's hand has been detected. According to one embodiment, the user places at least a portion of the palm and one or more fingers on the touch surface. Other requirements may be utilized. For example, a hand may only be recognized when a portion of the palm, a thumb and two other fingers are detected. Additionally, according to some embodiments, the user may only have to place their hand near the surface of the touch surface.

Moving to operation 520, a size of the hand that is detected by the touch surface is determined. According to one embodiment, the size is determined by a detected location of the palm and the detected locations of the finger tips.

Flowing to operation 530, the virtual input device customized for the user's hand is created. For example, the virtual input device is not only sized for the user's hand but can also be created based on a number of fingers on the hand, a dislocated finger, and the like. As discussed above, the virtual input device may be a virtual mouse ring having zero or more buttons or a virtual keyboard ring.

Transitioning to operation 540, the virtual input device is displayed. According to one embodiment, the virtual input device is displayed beneath a portion of the user's hand. As discussed above, according to one embodiment, when the virtual input device is a virtual mouse ring a mouse button is displayed beneath each finger. Additionally, a virtual input device may be created and displayed for each hand that is detected by the touch surface.

Moving to operation 550, the virtual input device(s) displayed receives input from the user while the hand is detected by the touch input device. For example, a user may move their hand across the touch surface, a user may pick a finger up and then press the finger down to select a button, a user may move two fingers to perform a touch operation, and the like.

Flowing to operation 560, the virtual input device is removed when the user's hand is no longer detected by the touch input device.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for creating a virtual input device on a touch input device, comprising:
   determining when a portion of a hand is detected by the touch input device;
   when the portion of the hand is detected by the touch input device:
      determining a size of the portion of the hand;
      dynamically creating and sizing the virtual input device based on the determined size of the portion of the hand, wherein an inner area of the virtual input device is sized to contain the portion of the hand;
      displaying a graphical representation of the virtual input device on the touch input device, wherein displaying the graphical representation comprises:
         displaying a circular graphic and an associated cursor on the touch input device that moves in response to a movement of the portion of the hand;
         displaying one or more buttons on an outer boundary of the circular graphic;
         defining a central area of the circular graphic defined by the one or more buttons on the outer boundary of the circle, wherein the central area is operable to accept multi-finger touch operations that use the associated cursor as a focal point including one or more of: panning, zooming, and rotating;
      receiving user input from the virtual input device through an interaction between the portion of the hand and the circular graphic of the virtual input device.

2. The method of claim 1, wherein movement of the virtual input device on the touch input device moves a cursor on a display screen.

3. The method of claim 1, wherein displaying the one or more buttons comprises determining a size of each of the at least one finger of the hand and a location of a palm; and sizing each of the one or more buttons based on the determined size and location.

4. The method of claim 1, wherein the virtual input device is a virtual mouse ring that includes a virtual mouse button that is disposed beneath each detected finger of the hand; wherein each virtual mouse button is associated with an action.

5. The method of claim 1, further comprising determining a size of each detected finger and creating a virtual mouse button that is sized according to the determined size of each detected finger.

6. The method of claim 1, wherein the virtual input device is a split keyboard when two hands are detected by the touch input device, wherein keys of the keyboard are divided between a display disposed beneath each hand.

7. The method of claim 1, wherein when a virtual button is selected displaying a list of menu items in place of the display of the virtual button.

8. The method of claim 1, further comprising determining when the hand becomes undetected and when the hand becomes undetected removing the virtual input device from the touch input device.

9. A computer-readable storage device having computer-executable instructions for creating a virtual input device in response to a touch input, comprising:
   determining when a portion of a hand is detected by a touch input device;
   when the portion of the hand is detected by the touch input device:
      automatically determining a size of the portion of the hand;
      dynamically creating and sizing the virtual input device based on the determined size of the portion of the hand; wherein an inner area of the virtual input device is sized to completely contain the portion of the hand detected by the touch input device;
      displaying a graphical representation of the virtual input device, the graphical representation of the virtual input device, comprising:
         a display of a circular graphic beneath the portion of the hand that is detected by the touch input device, wherein the circular graphic is operable to respond to a movement of the portion of the hand to remain beneath the portion of the hand as the portion of the hand moves and wherein a cursor associated with the circular graphic moves in correspondence with the circular graphic, the circular graphic including one or more buttons on an outer boundary of the circular graphic and defining a central area of the circular graphic defined by the one or more buttons on the outer boundary of the circle, wherein the central area is operable to accept multi-finger touch operations that use the cursor as a focal point including one or more of: panning, zooming, and rotating;
      receiving user input from the virtual input device through an interaction between the portion of the hand and the virtual input device; and
      removing the virtual input device when the hand becomes undetected by the touch input device.

10. The computer-readable storage device of claim 9, wherein creating the virtual input device comprises determining a type of virtual input device based on a context of an application.

11. The computer-readable storage device of claim 9, wherein the virtual input device is a virtual mouse ring that includes at least two virtual mouse buttons that are disposed beneath each detected finger of the hand.

12. The computer-readable storage device of claim 9, wherein the virtual input device is a virtual ring that consists of a single input ring wherein an inside of the ring is used for multi-finger touch operations.

13. The computer-readable storage device of claim 9, wherein the virtual input device is a portion of a keyboard.

14. The computer-readable storage device of claim 11, wherein when a virtual mouse button is selected by tapping one of the fingers on the virtual mouse button, displaying a list of menu items in place of the display of the virtual mouse button.

15. The method of claim 1, further comprising:
   determining when a portion of a second hand is detected by the touch input device;
   in response to detecting the portion of the second hand, creating a second virtual input device;
   determining a size of the portion of the second hand that is placed on the touch input device;
   dynamically sizing the second virtual input device based on the determined size of the portion of the second hand;
   displaying a graphical representation of the second virtual input device that includes a display of a second circular graphic beneath the portion of the second hand;
   determining when a two-handed operation has been received in response to receiving user input from the first virtual input device and receiving user input from the second virtual input device;
   determining when the second hand becomes undetected and when the second hand becomes undetected, halting display of the second virtual input device on the touch input device.

16. A system for creating a virtual input device on a touch screen, comprising:
   the touch screen;
   a processor and a computer-readable medium;
   an operating environment stored on the computer-readable medium and executed by the processor; and
   a touch manager operating under control of the operating environment and operable to:
   detect a portion of a hand by the touch screen;
   in response to detecting the portion of the hand, create the virtual input device on the touch screen, the virtual input device having:
      an outer boundary operable to receive a movement input, the outer boundary having a button operable to receive a tap input, wherein the movement input comprises a detection of the hand moving on the touch screen and wherein the tap input comprises a detection of the hand being picked up and subsequently pressed on the button of the outer boundary; and
      a central portion defined by the outer boundary, the central portion comprising an area operable to receive multi-finger touch input associated with an action to perform one or more of: panning, zooming or rotating;
   in response to receiving the movement input at the outer boundary, move the virtual input device on the touch screen in correspondence with the movement input;

in response to receiving the tap input at the button of the outer boundary, invoke a function within the operating environment;

in response to receiving the multi-finger touch input at the central portion, invoke a multi-finger touch operation within the operating environment.

17. The system of claim 16, wherein the multi-finger touch input includes at least two fingers of the hand being detected within the central portion by the touch screen, wherein each of the detected fingers is detected as having a motion in opposition to the other detected finger's motion, such that combining the opposing motions results in no movement of the virtual input device.

18. The system of claim 16, wherein the outer boundary includes a second button, the second button being disposed of beneath at least two fingers of the hand being detected by the touch screen.

19. The system of claim 16, wherein the touch manger is further operable to:

in response to losing detection of the hand, delete the virtual input device from the touch screen.

\* \* \* \* \*